United States Patent [19]
Arai et al.

[11] 3,803,065
[45] Apr. 9, 1974

[54] RESIN COMPOSITION

[75] Inventors: Masakazu Arai; Junichi Yasuda, both of Yokkaichi, Japan

[73] Assignee: Mitsubishi Petrochemical Company, Tokyo, Japan

[22] Filed: Nov. 13, 1972

[21] Appl. No.: 305,711

[30] Foreign Application Priority Data
  Nov. 12, 1971  Japan................................ 46-90457

[52] U.S. Cl.......................260/23 H, 260/32.6 PQ, 260/33.4 PQ, 260/41 A, 260/94.9 GB
[51] Int. Cl. ............................................ C08f 19/14
[58] Field of Search ......... 260/23 H, 94.9 GB, 93.7, 260/41 A, 32.6 PQ, 33.4 PQ

[56] References Cited
UNITED STATES PATENTS
3,463,751  8/1969  Hasegawa........................ 260/23 H
3,591,540  7/1971  Praskach.......................... 260/23 H

*Primary Examiner*—Donald E. Czaja
*Assistant Examiner*—William E. Parker
*Attorney, Agent, or Firm*—Oblon, Fisher, Spivak, McClelland & Maier

[57] ABSTRACT

A resin composition with excellent anti-blocking properties and transparency which comprises a polyolefin resin admixed with a fine, modified inorganic powder which is prepared by mechano-chemically modifying the fresh surface of an inorganic powder with a surface modifier selected from the group consisting of fatty acids, metal salts of fatty acids, aliphatic alcohols, aliphatic amides and aliphatic amines.

5 Claims, No Drawings

3,803,065

RESIN COMPOSITION

BACKGROUND OF THE INVENTION

1. Field of the Invention

This invention relates to a resin composition possessing excellent anti-blocking properties and transparency.

2. Description Of The Prior Art

It has been known to prevent blocking in polyolefin films by admixing polyolefin resins with fine inorganic powders. However, these films have the disadvantage of a decreased transparency. If an inorganic powder such as a pigment is admixed with a resin, metal containing soaps such as aluminum, zinc or calcium stearates have been added to the resin composition in order to improve the dispersibility of the inorganic powders. Specifically, calcium carbonate has been modified with soap to improve its dispersibility in rubber and to reinforce the rubber. Titanium oxide has been modified and silica gel has been modified with an alcohol, an organic silicon compound or a hydrogen fluoride to improve its dispersibility in an organic compound.

Studies were conducted in order to provide an anti-blocking effect in olefin resin by modifying the surfaces of inorganic powders admixed with the resins. However, while the dispersibility of the inorganic powders in the resins had improved, the transparency of the resulting compositions decreased.

Heretofore, films of polyolefins such as low density polyethylene and polypropylene have had excellent transparency, moisture resistance, heat sealing effects, oil resistance and strength. Thus, large amounts of these films have been used as packaging materials for food and fabrics. For these uses, a high degree of transparency of the films has been required. However, as the transparency of these films has been improved, the disadvantageous property of blocking occurs. Blocking results in a loss of efficiency in operational steps such as the slitting step, the printing step, the bag forming step and the mouth opening step for both tubular films and flat films. Sometimes, the films are torn. Thus, in order to improve the blocking properties of films, fine inorganic powders have been admixed with polyolefin resins.

Prior art processes have included the addition of aliphatic amides such as oleic amide to the polyolefin resin. When the amount of aliphatic amide admixed is too great, the resulting films become white upon aging because of the migration of the aliphatic amides to the surface of the films. In addition, the adhesiveness of applied printing inks decreases. Thus, the amount of aliphatic amide admixed with the resin must be limited. Improvements in the blocking properties of this film has been mainly provided by the addition of fine inorganic powders to the resins. However, while the addition of fine inorganic powders to the resin improves the blocking properties of these films, it also causes a concommitant loss of transparency in the films.

Anti-electrostatic films and non-water drop films have high blocking properties. Thus, it is necessary to add larger amounts of fine inorganic powders to these films in order to prevent blocking. However, these films lose their transparency upon incorporation of the inorganic powders. In view of the blocking problems associated with polyolefin resins, a need exists for suitable additives which prevent blocking in these films, while at the same time resulting in films which possess good transparency.

SUMMARY OF THE INVENTION

Accordingly, it is an object of this invention to provide a polyolefin resin composition which has excellent transparency and exhibits good anti-blocking characteristics.

It is another object of this invention to provide a polyolefin resin composition with excellent transparency and anti-blocking characteristics by incorporation of a fine inorganic powder prepared by an economical process in the resin composition.

These objects and other objects of this invention, as hereinafter will become apparent, can be attained by a resin composition comprising a polyolefin resin and an inorganic powder modified by a mechano-chemical process wherein an unmodified inorganic powder or a powder mass with a particle size larger than that of the modified powder is admixed with a modifier selected from the group consisting of fatty acids, metal salts of fatty acids, aliphatic alcohols, aliphatic amides, and aliphatic amines, and crushed into a fine powder. The surface of the resulting inorganic powder is modified and possesses hydrophobic properties.

DESCRIPTION OF THE PREFERRED EMBODIMENTS

Suitable polyolefin resins of this invention include polypropylene; copolymers of propylene and $\alpha$-oelfins such as ethylene, butene-1, pentene-1, heptene-1, peptene-1, octene-1, 3-methylbutene-1 and 4-methylpentene-1, and mixtures thereof; polyethylene; and copolymers of ethylene vinylacetate, ethylene-acrylic acid esters, and mixtures thereof.

Suitable unmodified inorganic powders or powder masses used in accordance with this invention, include:

(1) silica gel,
(2) anhydrous silicic acid,
(3) silicic acid hydrate,
(4) calcium silicate hydrate,
(5) aluminum silicate hydrate,
(6) calcium carbonate,
(7) barium carbonate,
(8) calcium sulfate,
(9) barium sulfate,
(10) talc,
(11) clay The unmodified inorganic powder or powder mass is crushed with a modifier in a conventional crusher such as a vibration mill, a pot mill, a speed line mill, or a colloid mill to yield a fine, modified, inorganic powder. The average particle size of the modified inorganic powder is in the range of 0.1–15$\mu$, preferably 1–6$\mu$ if the powder is to be used in non-stretched films or in molded articles other than films. On the other hand, the average particle size is less than 300 m$\mu$, preferably 10–200 m$\mu$, if the powder is to be used in stretched films.

If the average particle size of the inorganic powder incorporated in the film is greater than the upper limit, the appearance of the film deteriorates. If the average particle size of the inorganic powder is less than the lower limit, the anti-blocking characteristic of the resulting film is diminished.

The modifiers of this invention are aliphatic compounds possessing polar groups which have good affinity for the inorganic powder or powder mass. Suitable modifiers include fatty acids, metal salts of fatty acids, aliphatic alcohols, aliphatic amides and aliphatic amines, and the like. Polar groups in the aliphatic compounds include —OH, —COOH, —COOMe, —CONH$_2$, —NH$_2$, and the like. The aliphatic residues of the modifiers have a high affinity for the polyolefin resins. Straight chain aliphatic residues rather than cyclic aliphatic residues have a greater dispersibility in the polyolefin resins. Preferably, compounds containing more than ten carbon atoms per chain are used and are readily available.

The amount of modifier admixed with the inorganic powder is in the range of 0.1–30 weight percent, preferably 1–10 weight percent, of the weight of inorganic powder. If the amount used is less than 0.1 weight percent, the desired effect of this invention is not found. If the amount used is more than 30 weight percent, no greater improvements result over those already observed for the increased amount of modifier used.

The following is a list of suitable, specific modifiers useful in this invention.

1. Fatty acids and Metal Salts of Fatty acids

Saturated fatty acids ranging from $C_{10}$ (capric acid) to $C_{24}$ lignoceric acid) are used. Preferably, readily available palmitic acid ($C_{16}$) and stearic acid ($C_{18}$) are used. Unsaturated fatty acids with greater than 18 carbon atoms, preferably erucic acid ($C_{22}$) are used.

Suitable metal cations for the fatty acid salts include:

| monovalent metals | (Li,Na,K), |
| divalent metals | (Mg,Ca,Ba,Zn,Cd), |
| trivalent metals | (Al), and |
| tetravalent metals | (Pb). |

Preferably, monovalent and divalent metal salts of the fatty acids are used.

2. Aliphatic alcohols

Saturated alcohols ranging from $C_{10}$ (decanol) to $C_{28}$ (eicosanol) are used. Preferably, tetradecanol ($C_{14}$), hexadecanol ($C_{16}$) and octadecanol ($C_{18}$) are used. Unsaturated alcohols include alcohols such as oleyl alcohol. Polyalcohols include glycerine polyethyleneglycol, polypropyleneglycol, and the like.

3. Aliphatic amides

Saturated amides ranging from $C_{10}$ (undecylamide) to $C_{22}$ (docosylamide) are used. Preferably, readily available stearylamide is used. Unsaturated amides include readily available oleylamide ($C_{18}$), ethylene bisaliphatic amides, and polyoxyethylene alkylamides such as N,N-bis(2-hydroxyethyl)alkylamides ($C_{12}$–$C_{18}$).

4. Aliphatic amines

Preferably, $C_{14}$ (tetradecyl amine) to $C_{22}$ (docosyl amine) aliphatic amines are used. Polyoxyethylene alkylamines such as N,N-bis(2-hydroxyethyl)alkylamines ($C_{12}$–$C_{18}$) can also be used.

In the process of this invention, the inorganic powder or powder mass is treated with a surface modifier. Suitable methods of treatment include solid phase treatments, liquid phase treatments, vapor phase treatments, and the like. The solid phase treatment method can be accomplished by admixing an inorganic powder mass or coarse powder with a surface modifier, and then crushing the mixture in a mill to provide mechano-chemical reaction between the reactants. The liquid phase treatment method can be accomplished by treating the inorganic powder mass or coarse powder with an aqueous solution or a solvent solution of the surface modifier, and then crushing the treated inorganic powder mass or coarse powder to provide a mechano-chemical reaction between the reactants. The vapor phase treatment method can be accomplished by vaporizing an aliphatic amine, an aliphatic alcohol or a fatty acid, adsorbing the vapors on the surface of the inorganic powder mass or coarse powder, and crushing the treated solid residue. Another treatment method can be accomplished by adding the surface modifier with a crystallized mass of inorganic material, and crushing the treated inorganic material. The inorganic powder mass or coarse powder should be crushed to a fine powder in order to form a fresh, large surface area to which the surface modifier is mechanochemically coated.

The modified fine inorganic powder prepared by crushing the inorganic material with a surface modifier is blended with a polyolefin resin in amounts ranging from 0.01–2.0 weight percent, preferably 0.05–0.50 weight percent of the amount of resin. If less than 0.01 weight percent modified powder is used, the desired antiblocking effect is not found in the resin product. On the other hand, if more than 2.0 weight percent modified inorganic powder is used, besides being uneconomical, no increased antiblocking effect is observed in the resin product corresponding to the increased amount of modifier employed. If the amount of modified inorganic powder added to the polyolefin resin is too large, the transparency of the resin composition is decreased.

Blending of the modified inorganic powder with the polyolefin resin can be accomplished with a conventional kneader for plastics, a screw blender, or the like. The following description outlines the various processes useful for the preparation of films using a polyolefin resin composition of this invention.

1. Preparation of tubular films polypropylene:

| Apparatus: | Tubular polypropylene film apparatus manufactured by Kawada Seisaku-sho K.K. |
|---|---|
| Diameter of extruder | 45 mm |
| Die | 100 mm |
| Screw rotation | 100 rpm. |
| Resin temperature | 230°C |
| Distance between die and air ring | 100 mm |
| Distance between die and water cooled ring | 300 mm |
| Film thickness | 30μ |
| Blow rate | 1.4 |
| Take up speed | 20 m/min. |

2. Preparation of biaxial stretched polypropylene films:

| Apparatus: | Biaxial stretched film apparatus manufactured by Mitsubishi Jyuko K.K. |
|---|---|
| Diameter of extruder | 115 mm |
| Die | straight manifold type |
| Screw rotation | 30 rpm. |
| Resin Temperature | 270°C |
| Quench roller | 20°C |
| Sheet thickness | 1.0 mm |
| Longitudinal stretch: | Rapidly stretched 500% by a peripheral different velocity of the hot roller at 135°C. |
| Vertical stretch | Stretched 600% in a tenter at 160°C and with a heat treatment at 155°C for 5 seconds. |
| Thickness of film | 30μ |

3. Preparation of low density tubular polyethylene films:

| Apparatus | Tubular film apparatus manufactured by Mitsubishi Jyuko K.K. |
|---|---|
| Diameter of extruder | 40 mm |
| Screw rotation | 70 rpm. |
| Resin temperature | 160°C |
| Distance between die and air ring | 65 mm |
| Blast line height | 280 mm |
| Blow rate | 1.5 |
| Take up speed | 20m/min. |

4. Preparation of cast (T-die) films:

| Apparatus | Cast film apparatus manufactured by Modern Machinery K.K. |
|---|---|
| Diameter of extruder | 90 mm |
| Screw rotation | 75 rpm. |
| Resin temperature | 245°C |
| Quench roller temperature | 25°C |
| Die | straight manifold type |
| Distance between die and film contact area of quench roller (air-knife for contacting film to quench roller) | 60 mm |
| Thickness of film | 25μ |
| Take up speed | 85m/min. |

The qualities of the films prepared by these processes are evaluated by the following testing methods:

1. (Haze)

Haze of the films was measured by the ASTM D 1003-61 method. Transparency of the films was calculated as percentage units.

2. Antiblocking Properties

Two freshly prepared sheets of film (300×300 mm) are plied and a weight of 50 g/cm² is applied to the plied films at 40°C for 24 hours. A test piece with a 20 mm width and a 110 mm length (contacting area 20–50 mm) is cut and the maximum weight required to peel the upper film from the lower film is measured by a friction coefficient tester manufactured to Toyo Seiki K.K.. The peeling velocity of the film is 150 mm/min. The antiblocking property is based on a unit of g/10 cm².

3. Coefficient of static friction

The coefficient of static friction is measured by the ASTM D 1894 method and shows the slipping properties of the films.

4. Melt index

The melt index is measured by the ASTM D 1238 method.

Having now generally described the invention, a further understanding can be attained by reference to certain specific examples, which are provided for purposes of illustration only and are not intended to be limiting in any manner unless otherwise specified.

EXAMPLE 1

A 500 g quantity of silica gel with an average particle diameter of 5 mm was admixed with 50 g of calcium stearate. The mixture was charged into a 10 liter pot mill, crushed in air at 20°C at the rate of 50 rpm for 48 hours, and then dried for 1 minute at 350°C to yield a modified fine silica gel powder with an average particle diameter of 3 $\mu$.

A sample for reference was obtained by the same process except that calcium stearate was not used. A 0.40 weight percent quantity of the resulting fine silica gel powder was admixed with polypropylene powder manufactured by Mitsubishi Petrochemical Company (melt index 8.0 g/10 min; n-heptane extraction residue 96.0 weight percent) together with 0.05 weight percent 3.5 di-tert-butyl paracresol, 0.03 weight percent tetrakis [methylene-3-(3,5 di-tert-butyl-4-hydroxyphenl) propanoate] methane, and 0.25 weight percent oleic amide.

The powdery mixture was blended for 3 min by means of a "Super mixer" manufactured by Kawada Seisaku-sho K.K., and melt-extruded at 220°C by a granulator with a 40 mm extrusion diameter to yield a granular composition. To the granular composition was added unmodified fine silica gel and 10 weight percent calcium stearate based on the weight of silica gel. The mixture was blended and mixed in accordance with the above preparation (Table I, No. 2).

In accordance with preparation (1), a granular composition was extruded in the form of a tubular film in the polypropylene tubular film apparatus manufactured by Kawada Seisaku-sho K.K. with an extrusion diameter of 45 mm. The conditions of film formation are clearly outlined in preparation (1). The transparency, anti-blocking properties and static friction coefficient characteristics of the resulting polypropylene film are shown in Table 1.

TABLE I

| | No. | Fine silica gel powder | Melt index pellet (g/10 min) | Melt index film (g/10 min) | Cloudiness (Haze) (%) | Blocking Property (g/10 cm²) | Coefficient of static friction |
|---|---|---|---|---|---|---|---|
| Reference | 1 | Unmodified | 9.0 | 12.1 | 4.1 | 280 | 0.19 |
| Reference | 2 | Ca-stearate blend | 9.1 | 12.0 | 3.5 | 290 | 0.18 |
| Invention | 3 | Modified by Ca-stearate | 9.0 | 12.0 | 2.0 | 280 | 0.17 |

EXAMPLE 2

In accordance with the process of Example 1, 500 g of silica gel were admixed with 50 g each of stearic acid, hexadecanol, stearic amide, stearylamine, N, N-bis(2-hydroxyethyl) stearylamide and N, N-bis (2-hydroxyethyl) stearylamine, and the mixture was crushed to yield a modified fine powder. The modified fine powder was admixed with polypropylene powder and tested. The results of the test are shown in TABLE II.

TABLE II

|  | No. | Fine silica gel powder | Melt index pellet (g/10 min) | Melt index film (g/10 min) | Cloudiness (Haze) (%) | Blocking Property (g/10 cm²) | Coefficient of static friction |
|---|---|---|---|---|---|---|---|
| Reference | 1 | Unmodified | 9.0 | 12.1 | 4.1 | 280 | 0.19 |
| Invention | 2 | Modified by stearic acid | 9.5 | 15.5 | 1.9 | 300 | 0.18 |
| Invention | 3 | Modified by hexadecanol | 9.1 | 12.0 | 2.9 | 270 | 0.19 |
| Invention | 4 | Modified by stearylamide | 9.0 | 12.1 | 3.0 | 250 | 0.17 |
| Invention | 5 | Modified by stearylamine | 9.0 | 13.6 | 2.6 | 290 | 0.16 |
| Invention | 6 | Modified by bis(2-hydroxyethyl) stearylamide | 9.1 | 12.3 | 2.5 | 290 | 0.18 |
| Invention | 7 | Modified by bis(2-hydroxyethyl) stearylamine | 9.3 | 12.5 | 2.4 | 280 | 0.17 |

EXAMPLE 3

The modified fine silica gel powder prepared in accordance with the procedure of Example 1, was used in a polypropylene cast (T-die) film, and the unmodified powder was used as a reference. A 0.10 weight percent quantity of the fine silica gel powder was admixed with polypropylene powder manufactured by Mitsubishi Petrochemical Company (melt index 6.5 g/10 min., n-heptane extraction residue 96.0 weight percent. A 0.10 weight percent amount of 3,5-di-tert-butyl paracresol, 0.05 weight percent tetrakis [methylene-3-(3,5-di-tert-butyl-4- hydroxyphenyl) propanoate] methane, 0.08 weight percent erucic amide and 0.05 weight percent calcium stearate were added to the mixture. The powdered mixture was blended for 3 min. in a "Super mixer" manufactured by Kawada Seisaku-sho K.K., and melt-extruded at 220°C in a granulator with an extrusion diameter 50 mm to yield a granular composition. In accordance with preparation (4), the granular composition was extruded to form a flat film in the cast film apparatus manufactured by Modern Machinery K.K. with an extrusion diameter of 90 mm. The conditions of film formation are clearly outlined in preparative procedure ( 4). Test results are shown in TABLE III.

EXAMPLE 4

The modified fine silica gel powder prepared in accordance with Example 1, and the unmodified fine silica gel powder were separately admixed with portions of low density polyethylene. A 0.1 weight percent amount of fine silica gel powder was admixed with low density polyethylene manufactured by Mitsubishi Tetrochemical Company (melt index 1.7 g/10 min., density 0.924 g/cc) together with 0.05 weight percent 3,5-di-tert-butyl paracresol and 0.10 weight percent oleic amide, and the mixture was extruded from a granulator to yield a granular composition. In accordance with preparative procedure (3), a tubular film was prepared from the composition by an inflation film apparatus manufactured by Mitsubishi Jyuko K.K. with an extrusion diameter of 40 mm. The properties of the resulting film are shown in TABLE IV.

TABLE IV

|  | No. | Fine silica gel powder | Melt index pellet (g/10 min) | Melt index film (g/10 min) | Cloudiness (Haze) (%) | Blocking property (g/10 cm²) | Coefficient of static friction |
|---|---|---|---|---|---|---|---|
| Reference | 1 | Unmodified | 1.8 | 1.8 | 8.4 | 70 | 0.07 |
| Invention | 2 | Modified by Ca-stearate | 1.7 | 1.7 | 7.0 | 80 | 0.06 |

EXAMPLE 5

A 500 g quantity of silicic acid hydrate with an average diameter of 15 mm was admixed with barium stearate, and the mixture was charged to a 10 liter pot mill where it was crushed in air at 20°C at the rate of 50 rpm. for 48 hours. The resulting composition was dried for 1 minute to yield a modified fine silicic acid powder with an average particle diameter of 30 m$\mu$. A refer-

TABLE III

|  | No. | Fine silica gel powder | Melt index pellet (g/10 min) | Melt index film (g/10 min) | Cloudiness (Haze) (%) | Blocking Property (g/10 cm²) | Coefficient of static friction |
|---|---|---|---|---|---|---|---|
| Reference | 1 | Unmodified | 7.3 | 13.5 | 3.2 | 260 | 0.41 |
| Invention | 2 | Modified Ca-stearate | 7.2 | 13.3 | 2.3 | 270 | 0.47 | ence sample was obtained by the same process except without the addition of barium stearate. A 0.10 weight percent quantity of the resulting fine silicic acid powder was admixed with polypropylene powder manufactured by Mitsubishi Petrochemical Company (melt index 1.2 g/10 min.; n-heptane extraction residue 95.0 weight percent) together with 0.20 weight percent 3,5-di-tert-butyl paracresol, 0.05 weight percent tetrakis [-methylene-3-(3,5-di-tert-butyl-4-hydroxyphenyl) propanoate] methane, 0.05 weight percent calcium stearate and 0.06 weight percent erucic amide. The powdery mixture was blended for 3 min. in a "Super mixer" was extruded at 230°C from a granulator with an extrusion diameter of 40 mm to yield a granular composition. In accordance with preparation (2) which employes a biaxially stretched film apparatus manufactured by Mitsubishi Jyuko K.K. with an extrusion diameter of 115 mm, a biaxial stretched film with a thickness of 30μ was prepared. The properties of the resulting film are shown in TABLE V.

changes and modifications can be made thereto without departing from the spirit or scope of the invention as set forth herein.

What is claimed as new and desired to be secured by Letters Patent of the United States is:

1. A resin composition having a high transparency and antiblocking properties which comprises a polyolefin resin selected from the group consisting of polyethylene, polypropylene, copolymers of propylene and β-olefins, copolymers of ethylene-vinylacetate and ethylene-acrylic acid esters admixed with a modified fine inorganic powder, which powder is prepared by mechano-chemically bonding the fresh surface of an inorganic powder selected from the group consisting of silica gel, anhydrous silicic acid, silicic acid hydrate, calcium silicate hydrate, aluminum silicate hydrate, calcium carbonate, barium carbonate, calcium sulfate, barium sulfate, talc and clay with a surface modifier selected from the group consisting of $C_{10}$–$C_{24}$ fatty acids, metal salts of said fatty acids, $C_{10}$–$C_{28}$ aliphatic alco-

TABLE V

| | No | Fine silicic acid powder | Melt index pellet (g/10min) | Melt index film (g/10min) | Cloudiness (Haze) (%) | Blocking property (g/10cm$^2$) | Coefficient of static friction |
|---|---|---|---|---|---|---|---|
| Reference | 1 | Unmodified | 1.4 | 2.0 | 1.5 | 380 | 0.55 |
| Invention | 2 | Modified by Ba-Stearate | 1.5 | 2.1 | 0.8 | 400 | 0.57 |

EXAMPLE 6

Into a 10 liter pot mill was charged 5 liters of a 0.50% aqueous sodium stearate solution and 500 g of calcium carbonate with an average particle diameter of 10μ (5 wt % sodium stearate based on the powder) was added. After sealing the apparatus, the mixture was crushed for 24 hours at the rate of 50 rpm. The contents of the mill were centrifuged to separate the aqueous solution from the solids. The powder was dried at 105°C for 24 hours and then dried under a reduced pressure of –760 mmHg for 48 hours. A 500 g quantity of the resulting powder was charged to a 10 liter pot mill and crushed in air at 20°C for 48 hours at the rate of 50 rpm. The powder was then dried for 1 min. at 350°C to yield a modified fine powder with an average particle diameter of 40 mμ. In accordance with the preparation of Example 4, a biaxially stretched polypropylene film was prepared using the modified fine powder. The properties of the resulting film are shown in TABLE VI.

hols, $C_{10}$–$C_{22}$ aliphatic amides and $C_{14}$–$C_{22}$ aliphatic amines.

2. The resin composition of claim 1, wherein said inorganic powder is admixed with 0.1–30 weight percent of said surface modifier based on the weight of said inorganic powder, and wherein said polyolefin resin is admixed with 0.01–2.0 weight percent of said modified fine inorganic powder based on the weight of said polyolefin resin.

3. The resin composition of claim 1, wherein said modified line inorganic powder has an average particle diameter of 0.1–15μ and is admixed with said polyolefin resin to prepare a non-stretched film.

4. The resin composition of claim 1, wherein said modified inorganic powder with an average particle diameter of 0.1–15μ is admixed with said polyolefin resin to prepare a non-film article.

5. The resin composition of claim 1, wherein said modified fine inorganic powder has an average particle

TABLE VI

| | No. | Fine Ca CO$_3$ powder | Melt index pellet (g/10min) | Melt index film (g/10min) | Cloudiness (Haze) (%) | Blocking property (g/10cm$^2$) | Coefficient of static friction |
|---|---|---|---|---|---|---|---|
| Reference | 1 | Unmodified | 1.4 | 2.4 | 1.8 | 350 | 0.55 |
| Invention | 2 | Modified by Na-stearate | 1.3 | 2.3 | 1.0 | 390 | 0.58 |

Having now fully described the invention, it will be apparent to one of ordinary skill in the art that many diameter of 300–10 mμ and is admixed with said polyolefin resin to prepare a biaxially stretched film.

* * * * *